United States Patent [19]

Johnson et al.

[11] 3,743,300

[45] July 3, 1973

[54] TRANSDUCER AND INDEX MOUNTING ARRANGEMENT FOR DICTATING AND TRANSCRIBING UNITS

[75] Inventors: Fred W. Johnson; Edward R. Lloyd, both of Lexington, Ky.

[73] Assignee: International Business Machines Corporation, Armonk, N.Y.

[22] Filed: Dec. 15, 1970

[21] Appl. No.: 98,370

Related U.S. Application Data

[62] Division of Ser. No. 767,532, Oct. 14, 1968, Pat. No. 3,610,634.

[52] U.S. Cl. .................................... 274/4 J, 274/21

[51] Int. Cl. .................................... G11b 21/14

[58] Field of Search ................. 274/4 J, 1 R, 13–15, 274/17, 20–22; 179/100.2 T; 346/111 DM

[56] References Cited

UNITED STATES PATENTS

| | | | |
|---|---|---|---|
| 2,284,043 | 5/1942 | Clausen | 346/111 DM |
| 2,294,963 | 9/1942 | Clausen | 346/111 DM |
| 2,329,105 | 9/1943 | Clausen | 346/111 DM |
| 2,082,261 | 6/1937 | Runyan | 274/1 R |
| 3,056,606 | 10/1962 | Schueler | 274/17 |

*Primary Examiner*—Louis R. Prince
*Assistant Examiner*—Dennis A. Dearing
*Attorney*—Hanifin & Jancin and D. Kendall Cooper

[57] ABSTRACT

A dictating unit has an associated microphone with control buttons for establishing modes of operation and otherwise controlling the unit. The dictating unit is arranged for loading and unloading of a magnetic belt from the side. A transcribing unit has an associated headset and foot control and is arranged for loading and unloading of the magnetic belt from the front of the unit. However, each unit makes use of the same basic frame and common operating mechanisms. For maximum convenience, the common mechanisms are oriented in a preferred direction, differing by 90°, with reciprocable movement of transducer and index means in the dictating unit and transverse movement (at 90°) of the transducer and index means in the transcribing unit.

2 Claims, 24 Drawing Figures

INVENTORS
FRED W. JOHNSON
EDWARD R. LLOYD
BY D. Kendall Cooper
ATTORNEY

DICTATOR LOGIC

TRANSDUCER AND INDEX MOUNTING ARRANGEMENT FOR DICTATING AND TRANSCRIBING UNITS

The present case is a divisional application of the parent application Ser. No. 767,532, now U.S. Pat. 3,610,634 filed October 14, 1968.

CROSS REFERENCES TO RELATED PATENTS AND APPLICATIONS

U. S. Pat. No. 3,203,000, W. L. Dollenmayer, inventor; entitled "Marking Device for Dictating Machine."

U. S. Pat. No. 3,222,460, N. J. Albanes, et al., inventors; entitled "Multiple Station Selection System."

U. S. application Ser. No. 699,259, now U.S. Pat. No. 3,623,735, filed Jan. 19, 1968, inventors: C. M. Fackler, et al.; entitled "Dictating and Transcribing Apparatus with Automatic and Semi-Automatic Operation-Controlled Facilities."

U. S. application Ser. No. 699,246, now U.S. Pat. No. 3,588,119, filed Jan. 19, 1968; inventors: J. Cater, et al.; entitled "Dictating and Transcribing Apparatus with Rapid Transducer Alignment and Movement Facilities."

U. S. application Ser. No. 699,253, now U.S. Pat. No. 3,567,229, filed Jan. 19, 1968; inventors: C. L. Ridings, et al.; entitled "Transcribing Apparatus with Variable Automatic Recall Facilities."

U. S. Pat. No. 3,532,837, issued Oct. 6, 1970; inventors: J. Richard Dyar, et al.; entitled "Headset Featuring Collapsibility for Storage and Expandibility for Use."

OTHER REFERENCES

The following additional references are of interest:

IBM Technical Disclosure Bulletin, June, 1963, pp. 22 and 23, authored by B. F. Wehmer, entitled "Backspacer for Portable Dictator."

IBM Technical Disclosure Bulletin, May, 1967, pp. 1776 and 1777, authored by W. F. Wing, entitled "Retractable Cord Take-up Reel with Auto-Reset Cord Stop."

Customer Engineering Instruction Manual, Dictation Equipment, IBM Models 211, 212, and 213, form No. 241-5,071, dated Oct. 5, 1962.

Reference Manual, Dictation Equipment, IBM Models 211, 212, 213, and 214, form No. 241-5,132, dated Oct. 22, 1962.

BRIEF BACKGROUND OF INVENTION, INCLUDING FIELD AND PRIOR ART

GENERAL

The field of the invention encompasses dictating and transcribing apparatus, particularly those having provision for recording and reproducing sound on a magnetic record medium, such as a magnetic belt. Devices of this nature normally have means for operator control of the equipment. Thus, a dictating unit generally has an associated microphone with control buttons and a transcribing unit generally has a headset and a foot control. Prior art of interest is indicated below.

The Albanes, et al., patent noted in the Cross References section describes a magnetic belt dictating machine that is also representative of a prior art device of this nature. Comparable apparatus is also described in the Customer Engineering Instruction Manual and Reference Manual listed in the "Other References" section above.

Machine Controls and Circuits

Considering the dictating unit, the operator controls permit the establishment of a Record and a Listen mode of operation, together with forward spacing and backspacing in order to review previously dictated material. The transcribing unit generally operates in a Listen mode but also has provision for reviewing various portions of a previously dictated belt. Yerkovich U.S. Pat. No. 2,318,828 describes a belt dictation apparatus with provision for recording and reproducing information and also providing signals to indicate various conditions of the apparatus.

BELT LOADING AND UNLOADING, PHASING, HEAD RESTORING, AND RELATED CIRCUITS AND MECHANISMS

The apparatus described herein features a significantly efficient belt loading and unloading action together with a phasing operation as set forth in the Fackler, et al., patent, that is activated during belt loading to establish an initial starting point on the magnetic belt in order to insure accurate transducer tracking from machine to machine. The Yerkovich U.S. Pat. Nos. 2,318,828, 2,371,116, and 2,409,006 are representative of belt loading and unloading mechanisms in the prior art. The Albanes patent noted in the Cross Reference section above describes a dictating machine with manual loading and unloading of the belt.

Indexing

Most of the prior dictating and transcribing products have included some means for making index markings on a slip for later reference by a transcriber. The IBM device described in the Albanes patent and the Customer Engineering and Reference Manuals noted previously has provision for perforating an index slip. The Dollenmayer U.S. Pat. No. 3,203,000 describes an ink marking device for dictating machines that is similar in some respects to the marking mechanism used in the apparatus herein.

Retractable Microphone for Dictating Unit and Retractable Headset for Transcribing Unit Mundy U.S. Pat. No. 1,171,745 is typical of a prior art cord winder mechanism with two levels and a spring tension mechanism. The IBM publication authored by W. F. Wing, and previously noted, describes a retractable cord mechanism that is comparable in some respects to that used in the present apparatus.

SUMMARY

The invention concerns dictating and transcribing apparatus with increased efficiency of operation and improved compatibility. The equipment makes use of magnetic belt recording medium and has provision for semiautomatic belt loading and unloading and initial phasing to insure proper transducer tracking. The same basic belt handling mechanism is used in the dictating unit and the transcribing unit, differing primarily in the direction of orientation with respect to the operator. In the dictating unit, the mechanism is arranged for belt insertion and injection from the right side of the unit, while in the transcribing unit the mechanism is arranged for a front belt load and unload operation. For maximum convenience, the common mechanisms are oriented in a preferred direction, differing by 90°, with reciprocable movement of transducer and index means in the dictating unit and transverse movement (at 90°) of the transducer and index means in the transcribing unit. This arrangement insures both operating and manufacturing efficiencies. Ordinarily, the dictating unit requires a greater numer of operator controls than the transcribing unit and the side loading and unloading of the belt permits the arrangement of the primary controls, besides those on the microphone, within easy access range of the dictator.

Both units have circuitry and mechanisms for effecting forward and reverse movement of the transducer in relation to the belt medium including a measured review (incremental stepping) as well as a continuous spiral driving relationship in both the forward and reverse directions. The incremental stepping action is repeatable, at the option of the operator.

Objects

Accordingly, an object of the invention is to provide dictating and transcribing apparatus having inherent efficiency and compatibility, particularly with respect to orientation and arrangement of the various mechanisms.

Another object of the invention is to provide dictating and transcribing apparatus with greater flexibility of operation while maintaining effective operator control.

Also, an object of the invention is to provide simplified mechanisms for dictating and transcribing apparatus wherein movement of a sound head is effected in a direction either opposite to movement of the index indicator on the front of the equipment or at an angle, such as 90°, with respect to movement of the index indicator.

The foregoing and other objects, features, and advantages of the invention will be apparent from the following more particular description of the preferred embodiments of the invention as illustrated in the accompanying drawings.

TERMINOLOGY AND ABBREVIATIONS

The following terminology and abbreviations are used in several places in the diagrams of the present case:

| | |
|---|---|
| AE | Automatic Erase |
| Auto Off (AO) | Automatic power shut off |
| B Stage | Power Amplifier Stage |
| BAR | Dictate (Record) bar on microphone |
| BL | Belt is loaded |
| BUZ | Buzzer |
| CON | Conference |
| DIC | Dictate |
| EOB | End of Belt |
| FWD, F | Forward |
| HOLE | Initial phasing aperture in belt |
| HD | Hole Detect |
| HH | Head is in home position ("0" Index) |
| HR | Head Restore |
| LS | Lead screw contact |
| LET, END LTR, or LTR | Letter indication (index slip) |
| LIS 1, LIS 2 | Listen (Playback) contacts No, 1, No. 2 |
| MOT CONT | Motor Control |
| OSC | Oscillator |
| PB | Playback relay |
| PH1, PH2, etc. | Phase contacts No. 1, No. 2, etc transferred; Also $\phi 1$, etc. |
| $\overline{PH1}$, etc. | Phase contacts No. $\overline{1}$, etc., not transferred; Also $\overline{\phi 1}$, etc. |
| PS | Power Supply |
| R | Relay in transcriber unit |
| RP | Relay in dictator unit |
| RR | Relay in dictator unit (also transcriber unit) |
| RRP | Dictator Foot Control Relay |
| REC | Record mode |
| REG | Regulator |
| REV, R | Reverse (Backstep) or Review |
| SEC | Secretary indication (index slip) |
| Second Regulator | Circuit associated with transistor Q7 |
| SPKR | Speaker |
| STP CONT | Stepping Control |
| SW1 and SW2 | Switches in foot pedal |
| T | Transcriber Relay |
| TACH | Tachometer |
| TEL | Telephone |
| $\overline{TEL}$ | Conference or Dictate |
| TRA | Telephone Recording Attachment |
| X and Y | Wiring connections (P. 2 of 2) |
| $\phi$ | Phase |

DICTATING UNIT

General Description, Features, Operating Instructions, and Indexing

Figures 1, 1A, 2:
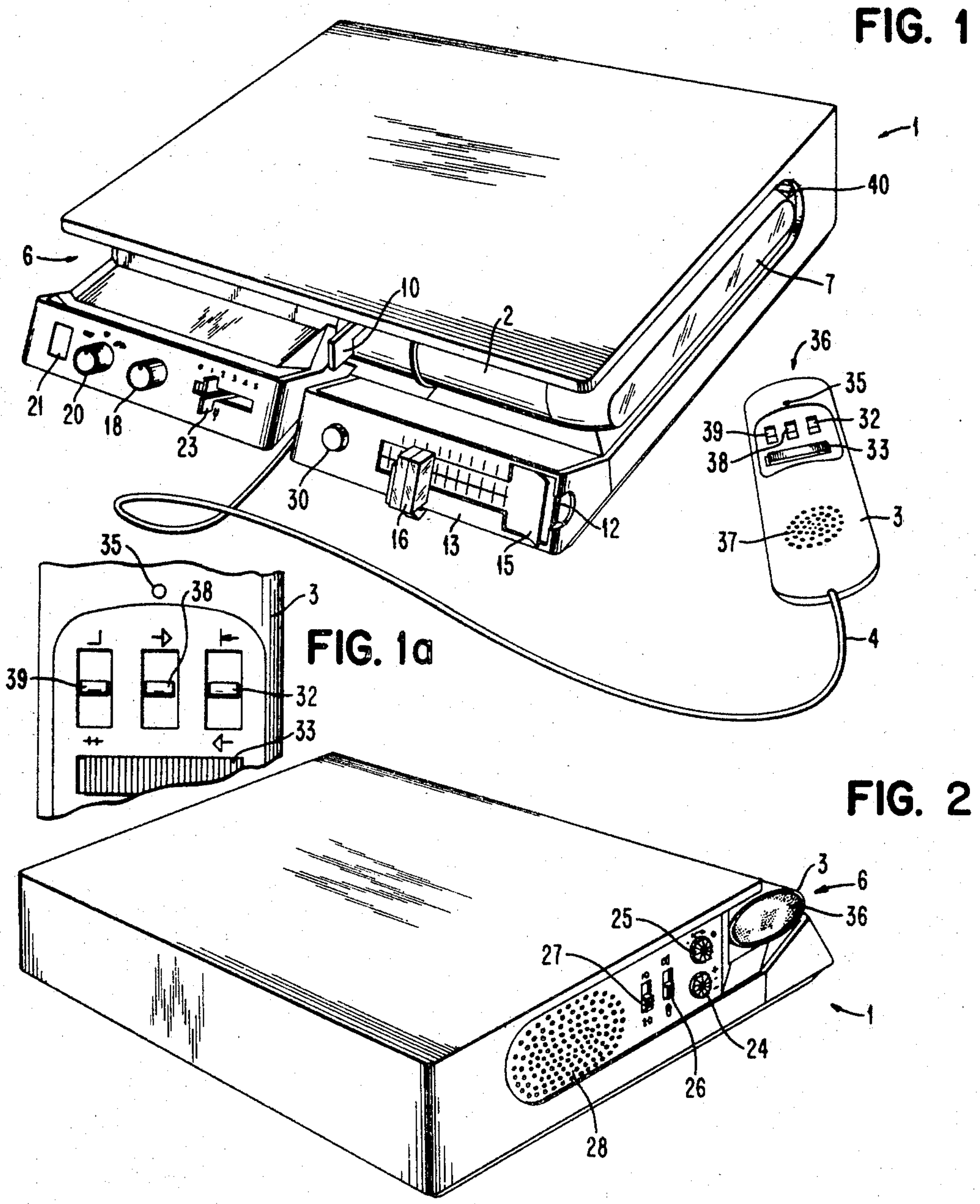
FIG. 1 is a perspective view of a dictating unit with associated microphone incorporating a variety of features according to the present invention.
FIG. 1*a* illustrates a number of operator controls on the microphone.
FIG. 2 is a rear perspective view of the dictating unit of FIG. 1.

The dictating unit 1 according to the present invention is shown in FIGS. 1 and 2, which are external views of the unit, and FIGS. 4–9 and 12*a* and 12*b*, that illustrate various internal mechanisms in the unit. The unit makes use of a magnetic belt record medium 2 shown in FIG. 3.

Dictating unit 1, has an associated microphone 3 attached thereto by a cord 4. The cord is retractable by mechanisms to be described. Microphone 3, when not in use, is positioned in a microphone well 6, FIGS. 1 and 2.

Dictating Unit Operating Instructions

For convenience, typical operating instructions for dictating unit 1 are presented below:

Loading the Belt

1. Belt 2 is placed on the machine by sliding it over mandrel 7. The arrows 9 on the belt should point toward the machine. The belt is inserted as far as it will go without forcing it.

2. Belt release lever 10 is moved to the left to complete belt loading.

Removing Belt

Belt release lever 10 is moved to the right to partially extend the belt from the machine for easy removal.

Index Slip Loading and Removal

For loading purposes, a complete pad 12 (25 slips) is inserted in holder 13 by sliding the slips to the left. An individual slip 15 is removed by grasping the right end and sliding it out.

Unit Operating Controls

1. Scanning Lever 16. This lever is used to manually locate sound head to any position on the recording belt.

2. Volume Control 18. Controls range of sound volume during playback.

3. Input Selector Switch 20. This switch is placed in the center position for Dictation. It also has a Telephone position (right) and Conference position (left).

4. Voice Modulation Indicator 21. The indicator shows voice or record level. It also serves as a battery indicator for those units equipped with battery.

5. Tuning Lever 23. This lever is normally used for transcribing to adjust the sound head position for proper tracking of sound track.

6. Speed Control 24. This control is used by the transcriber to adjust belt reproducing speed slower (−) or faster (+). It is an optional feature.

7. Input Sensitivity Control 25. Rotating this control clockwise (toward large dot) increases the recording level. Rotating the control counterclockwise (toward small dot) decreased recording level. This is adjusted to give satisfactory record volume with volume control set at the midposition (dot on volume knob at 12 o'-clock.)

8. Speaker Selector Switch 26. This switch selects microphone playback (lower position) or speaker playback (upper position).

9. Recording Time Selector 27. This switch gives the dictator the choice of 10 (upper) or 20 (lower) minutes of recording time. Normally this switch will be in the 10 minute position.

Microphone

Removing

The microphone 3 is removed by lifting it from the machine and extending the cord 4 by pulling the cord from the machine.

Replacing

The microphone is replaced by depressing the retract button 30 and guiding the microphone into its rest position in microphone well 6.

Operating Controls

1. Dictating. Preparation for dictating is begun by placing the record-listen selector button 32 in the Record (upper) position, |←, FIG. 1*a*. Dictate bar 33 is depressed and the dictator begins speaking into the pick-up element 36. When speaking continuously for long periods, dictate bar 33 can be locked into position by depressing and sliding it to the left, FIGS. 1 and 1*a*. It is unlocked by sliding to the right or moving selector button 32 to the Playback (middle) position. A red lamp 35 on the microphone glows when recording to indicate that the machine is in the record mode.

2. Reviewing. Dictation is reviewed by moving selector button 32 to the Review position, ←, and releasing. The selector is spring loaded to return to a position midway between Record and Review, which is the Playback position. When the speaker selector switch 26 is in the Microphone position (lower), playback is from a speaker 37 located in microphone 3. Otherwise, it is from a speaker 28 in the dictating unit. Each time selector button 32 is moved to the Review position, ←, the sound head in unit 1, moves back into the recorded material on belt 2 approximately 10 words or 6 seconds. As an option, holding selector button 32 in the Review position causes the sound head to move continuously back in 6 second increments. If the recording time selector 27 is in the 20 minute position, each increment is 12 seconds.

3. Forward Spacing. The sound head is advanced by moving the Forward spacing selector button 38 away from the dictate bar. The sound head then moves forward approximately 10 words or 6 seconds. As an option, holding the forward selector up causes the sound head to move forward continuously in 6 second increments. When the Forward selector is operated, the record selector button 32 reverts to the playback mode. If the recording time selector 27 is in the 20 minute position, each increment will be 12 seconds.

4. Index Marking. Moving the secretarial selector button 38 away from the dictate bar to the ⌋ position places a red dot, indicating End of Letter, on the top half of index slip 15. Moving the selector toward the dictate bar to the ╫ position places a red dot on the lower half of index slip 15 indicating to the transscriptionist that special instructions are recorded on the belt at that location.

Erasing the Belt

The erase bar 40 is not normally used by the dictator. However, occasionally it may be desirable to completely erase the entire belt. To do this, the erase bar is manually depressed. Since it locks into position, it is not necessary to hold it down. The microphone Record-Listen selector button 32 is placed in the Listen position.

Warning Tone

A warning tone may be generated at various times, any one of which requires some action on the part of the user. These are:

1. Attempting to dictate with the input selector switch 20 in the Telephone mode results in a warning signal. Moving selector switch 20 to the individual Dictate position, ▽, restores the machine to normal.

2. A short warning tone is generated one minute from the end of the belt. At this time, if dictation is to be continued, the user identifies himself, indicates he is continuing on another belt and places another unused or erased belt on the machine.

3. An end of belt warning signal is generated 15 seconds before the end of the belt. If the dictator continues to record through this signal, the machine automatically shuts off. If this occurs, the belt must be changed or the scanning lever 16 manually moved to the left.

Belt Loading and Initial Phasing

A significant feature of the dictating and transcribing apparatus is the belt loading and initial phasing operation. The apparatus includes mechanisms and circuitry that are operable upon insertion of a magnetic belt on mandrel 7, FIG. 1, to rotate the belt to a predetermined initial position. This insures that the sound head transducer will track a helical path on the belt beginning at an identical position each time the belt is inserted. Belt 2, FIG. 3, has an elongated aperture 2*a* that is sensed in the machine during the loading and phasing operation to establish the initial starting position on the belt.

Figure 15:
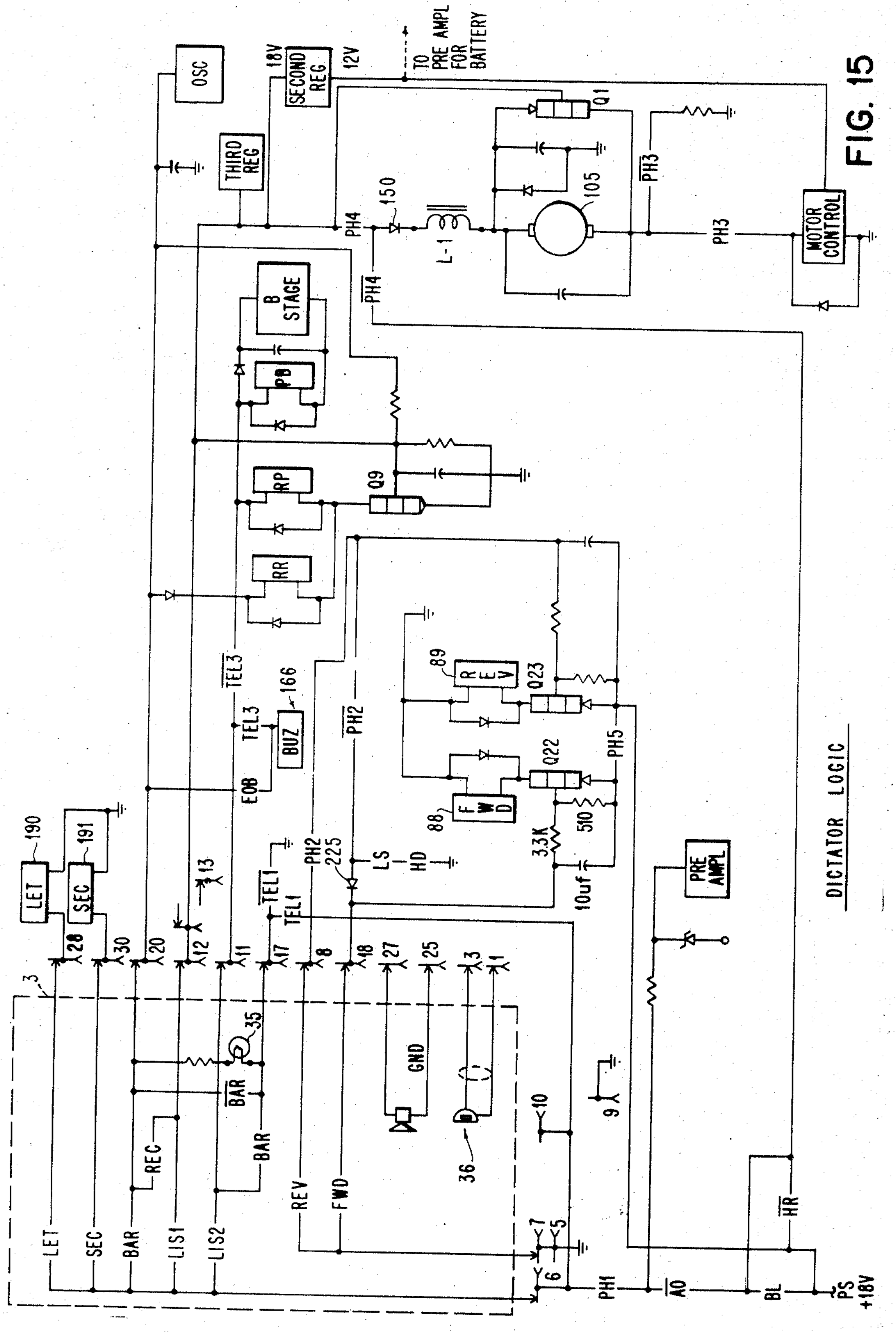
FIG. 15 is a simplified logic diagram of circuit actions in the dictating unit of FIG. 1.

Reference is made to FIGS. 1–8 for the dictating mechanisms and to FIG. 15 for various circuit logic involved for the dictating unit. The transcribing unit belt loading and phasing mechanisms are shown particularly in FIG. 14 and the circuit logic in FIG. 16. FIG. 8*a* illustrates the transcribing unit indexing (scanning) mechanism in particular.

A more detailed description is found in the Fackler, et al patent, but in essence, the same basic belt loading and unloading mechanisms are used both in the dictating unit and the transcribing unit, with a 90° difference in position or orientation.

Figure 4:
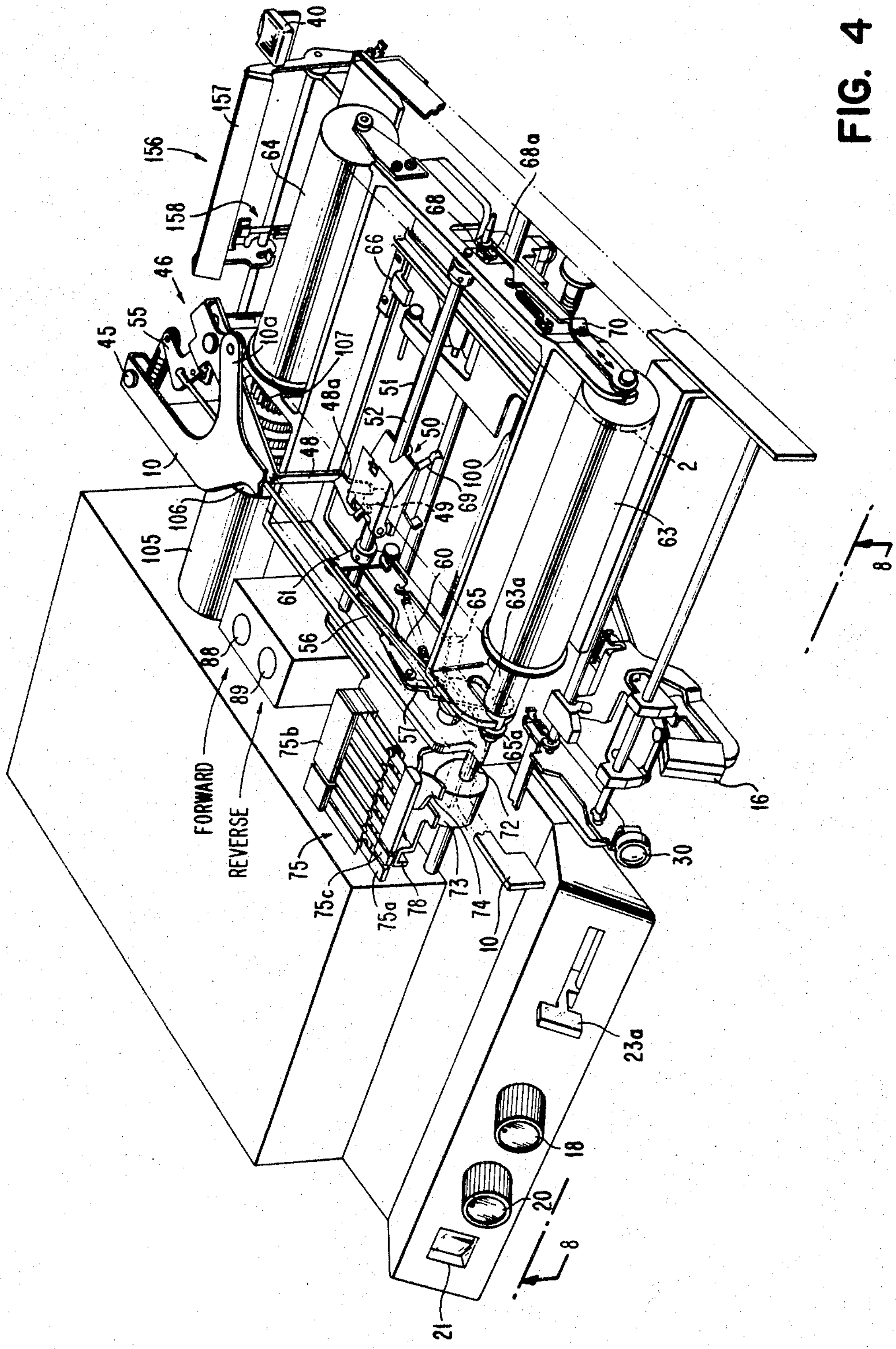
FIG. 4 is a right front perspective view of the dictating unit of FIG. 1 with the covers removed.

In the case of the dictating unit, FIG. 4, belt lever 10 extends toward the front of the unit in parallel with belt 2 when in loaded position and at right angles to rollers 63 and 64. In the transcriber unit, FIG. 14, the same basic mechanisms are used and the belt lever 10*b* extends toward the front of the unit, but at right angles to the belt, when mounted and parallel with the rollers, such as roller 63.

The functions of the belt loading and unloading mechanisms are:

1. Draw the belt into the machine from a partially inserted position.
2. Accurately position the belt in its running position.
3. Prevent partial loading of belt.
4. Partially eject the belt for easy removal.
5. Retract the idler tension roller and drop the sound head for ease of inserting and removing belt.

In order to load a belt 2 in the dictating unit, belt lever 10 is moved to the right. Lever 10 is pivotally mounted on pivot stud 45. Movement of lever 10 to the right operates various associated linkages and mechanisms to prepare the unit for receiving a belt. Lever 10 has an extension 10*a* that is pivotally attached to a bell crank assembly 46, FIG. 4. Attachment of extension 10*a* to assembly 46 rotates assembly 46 counterclockwise when lever 10 is moved to the right. Assembly 46 includes a link 48 that is attached by extension 48*a*, FIG. 4, to a pin 49 associated with a belt gripper assembly 50. A simplified gripper assembly 50*a* is shown in FIGS. 5, 6*a*–6*d* and 7*a*–7*c* to illustrate the principles of operation of this assembly. Assembly 50 is mounted for sliding movement on guide rods 51 and 52. Due to the interconnection of lever 10 with assembly 46 and particularly link 48, movement of lever 10 to the right also moves gripper assembly 50 to the right in readiness to receive a belt inserted in the unit.

Attached to another member 55 of assembly 46 is a link 56. The front end of link 56 is attached to a rotatable crank 57 that is movable front to back and vice versa. Crank 57 has a link 60 interconnecting it with another crank 61 that is fixedly mounted on rod 52. The function of crank 61 is to move front idler roller 63 to the rear toward rear drive roller 64 to enable the insertion of a belt on the rollers. This is done by provision of various linkages including link 65 that is attached at 65*a* to a smaller diameter axial portion 63*a* of roller 63. Attached to the rightmost end of rod 52 is a crank 68 having an extension 68*a* attached to a slider 70, also connected to the axial center of roller 63.

The action in contracting rollers 63 and 64 in relation to one another to receive a belt can be observed by reference to FIG. 4. As lever 10 is moved to the right, link 56 is operated toward the front of the machine. This rotates crank 57 toward the front of the machine and due to the interconnection of link 60, crank 61 is rotated in a clockwise direction. Rotation of crank 61 pulls link 65 toward the rear of the machine and also rotates crank 68 so that its connection to slide 70 pulls slide 70 toward the rear of the machine. This action, therefore, moves roller 63 to the rear closer to roller 64.

Mounted on the same shaft 72 as crank 57, is a contact operating cam 73 mounted under an operating member 74 to transfer various contacts in a contact assembly 75. A set of belt load contacts 75*a* is opened with movement of lever 10 to the right. A set of Phase contacts 75*b* is transferred to a not phased ($\overline{\text{Phase}}$) condition.

Figures 8, 8A, 9:
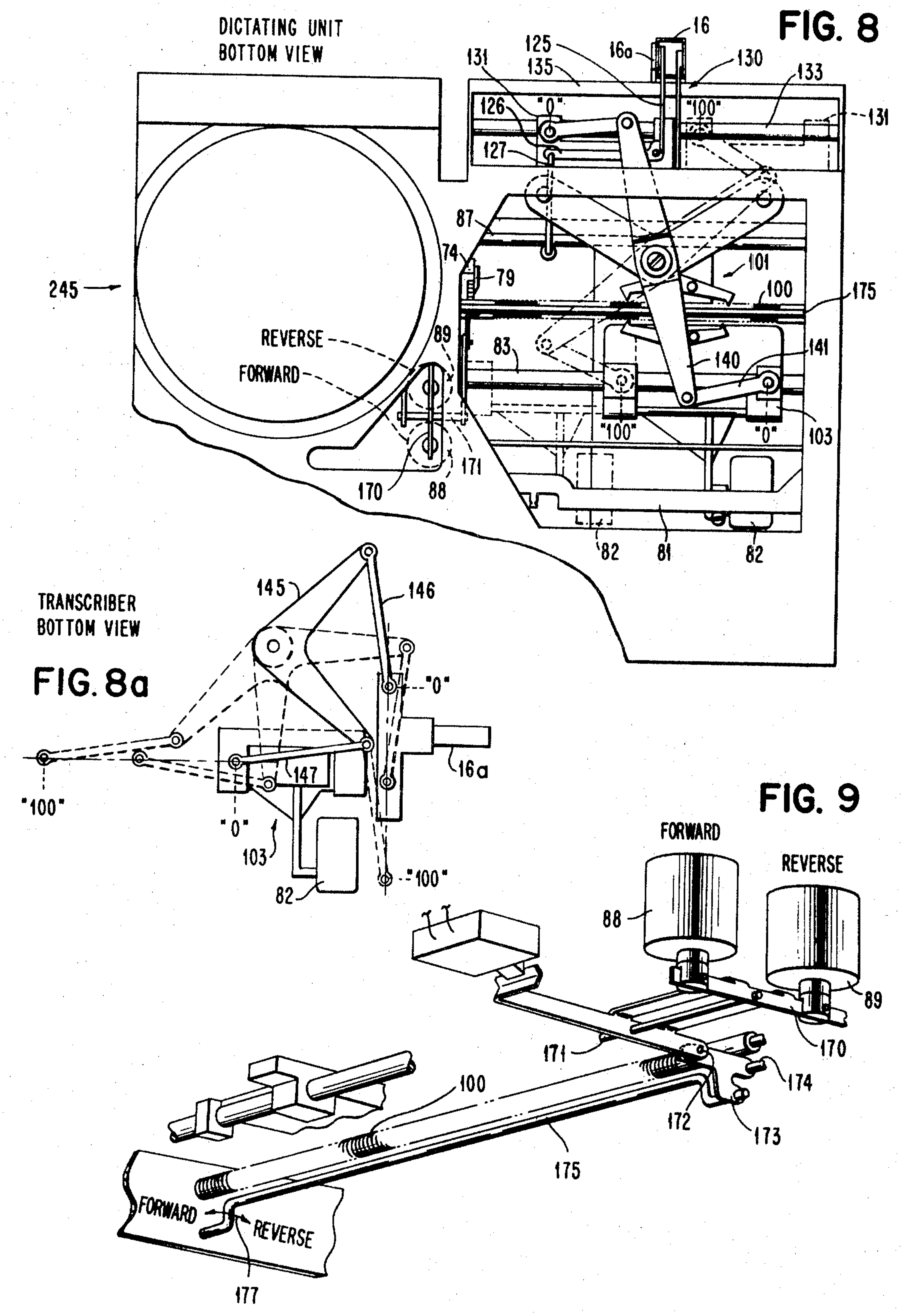
FIG. 8 is a bottom elevation of the dictating unit of FIG. 1 taken on the line 8—8, FIG. 4.
FIG. 8*a* is a comparable bottom elevation of the transcribing unit except on a reduced scale.
FIG. 9 shows solenoids, pawls and other mechanisms associated with forward and backspacing incrementing.

Attached to operating member 74 is link 79 shown in FIG. 8 that is connected to a head bail 81 for moving magnetic head 82 into and out of engagement with belt 2. At this time, head 82 is moved out of engagement. Bail 81 is pivotally and concentrically mounted about a shaft 83. Attached to extension 81*a* of bail 81 is a link 85. The other end of link 85 is connected to an operating portion of a pawl retract bail 87, FIGS. 12*a* and 12. Certain of these mechanisms can be seen to advantage in FIGS. 8 and 14.

Figures 13, 14:
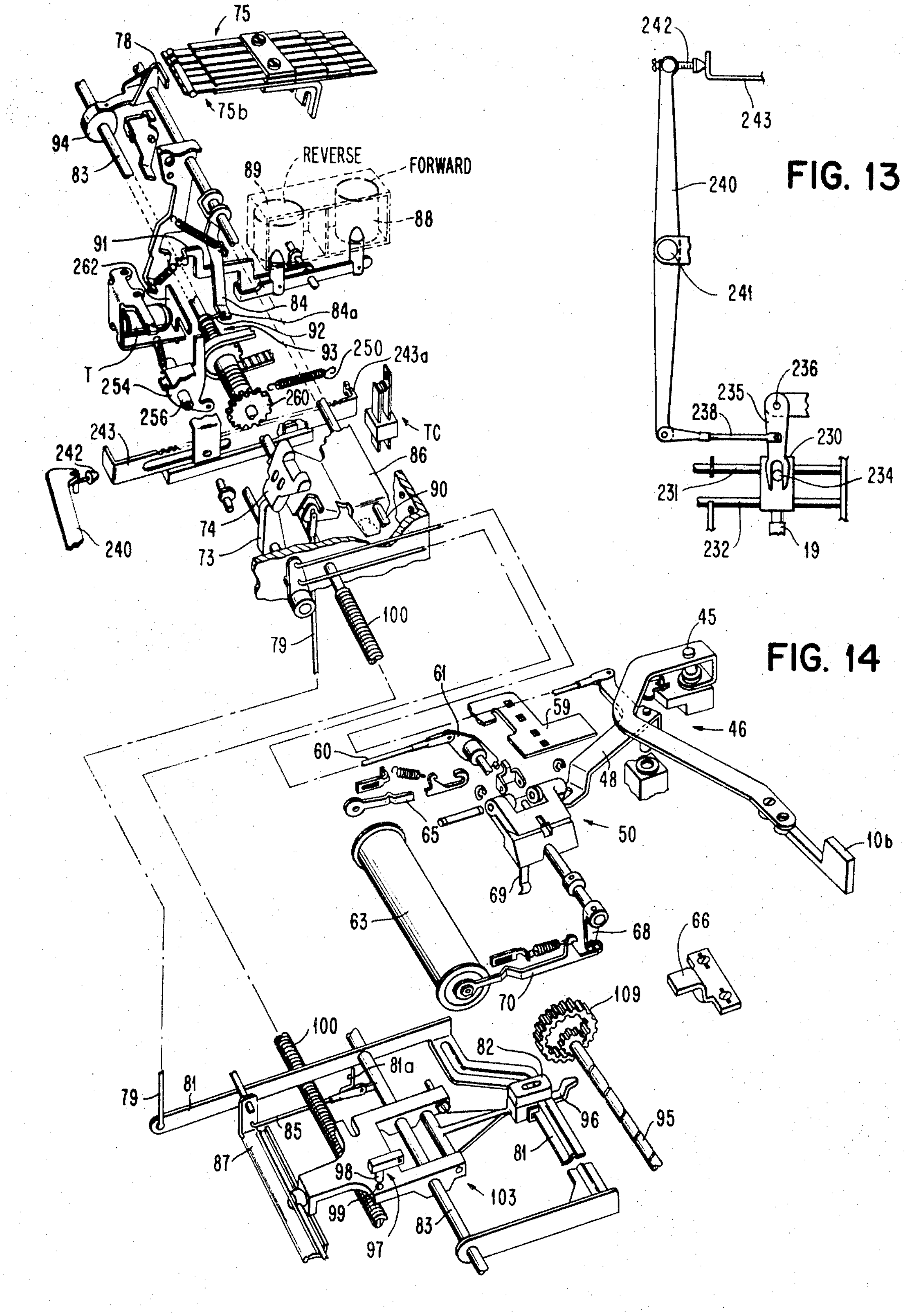
FIG. 13 representa an automatic recall control button and associated linkage for adjusting the recall rack in FIGS. 11 and 14.
FIG. 14 is a semi-exploded view of various components in the transcribing unit of FIG. 10 particularly showing portions of the belt loading-unloading mechanism, head restoring mechanism, head driving mechanism, forward and reverse mechanism, and an auto recall mechanism corresponding to that shown in FIG. 11. A large portion of the mechanism is similar to that used in the dictating unit of FIG. 1

Extending as a part of the operating member 74 is a bell crank 86 that is pivotally mounted at 90 and a link 84 having an extension 84*a* movable to the left in FIG. 14 for engagement with a pin 92 on a clutch member 93.

Figure 10:
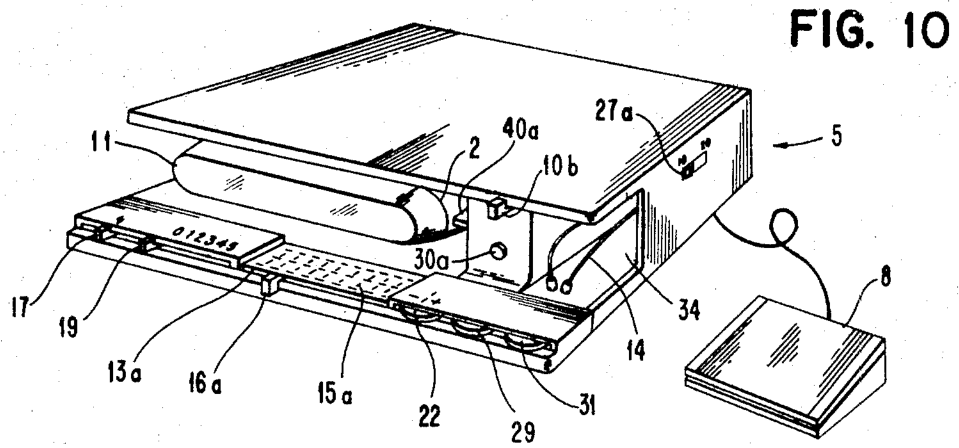
FIG. 10 illustrates a transcribing unit with provision for loading and unloading a belt record medium from the front and having an asssocaited head set and foot control.
Figure 11:
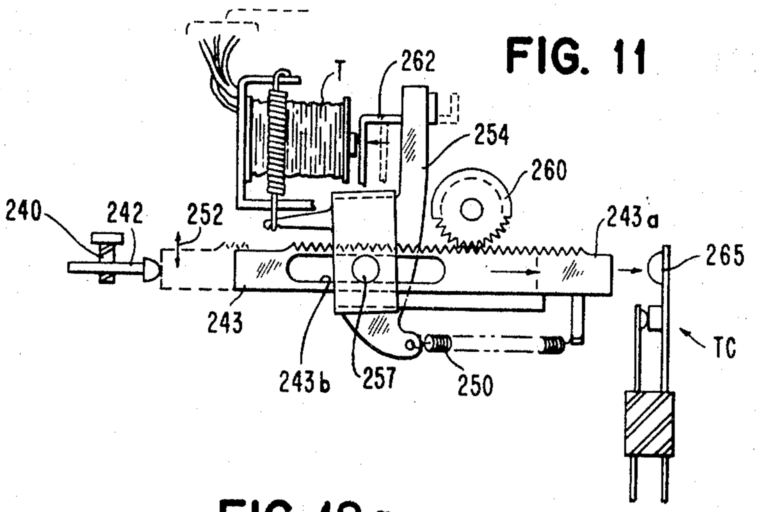
FIG. 11 shows an automatic recall rack and associated components for the transcribing unit of FIG. 10.

The various mechanisms just described move head 82 out of the way for insertion of a new belt and into engagement with a head restore lead screw 95 by way of a drive engaging member 96, FIG. 14. Concurrently with this action, link 85 moves pawl retract bail 87 from the engaged condition shown in FIG. 12*a* to the disengaged condition shown in FIG. 12*b*. This action disengages various pawls from a driving lead screw 100 which frees head 82 for driving movement to home position which is the right margin of the belt. The pawl mechanisms shown in FIGS. 12*a* and 12*b*, also serve for incremental Forward spacing and Reverse spacing. Reference is also made to FIG. 14 that represents an exploded view of various belt loading mechanisms in the transcriber unit of FIG. 10 that are quite similar to the mechanisms just discussed in FIGS. 4 and 8. Corresponding elements are similarly designated. Certain of the shapes of the elements may differ from the dictator to the transcriber unit, but the functions performed are similar. Reference is also made to FIG. 9 which shows the Forward and Reverse solenoids from the rear and underneath the dictating unit. To insure proper orientation among the various views of the stepping solenoids, the terms "Forward" and "Reverse" have been included in the drawings wherever appropriate.

Head Restoring Action

Figure 12A:
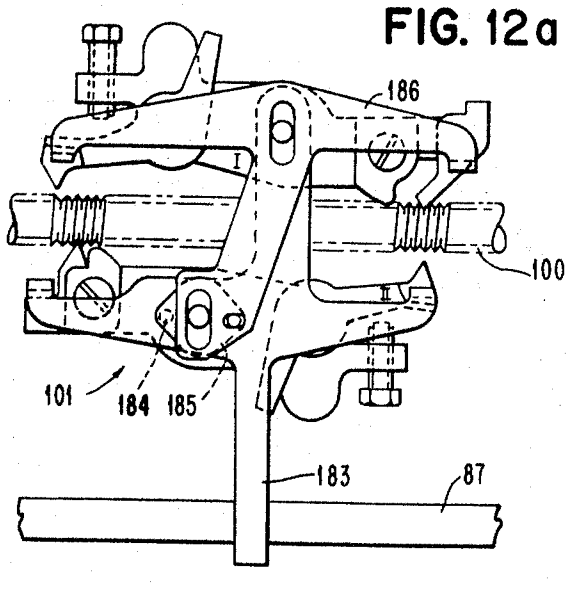
FIGS. 12*a* and 12*b* represent engaged and disengaged conditions of the forward and reverse pawls shown in FIG. 8 in connection with a manual scanning operation.
Figure 12B:
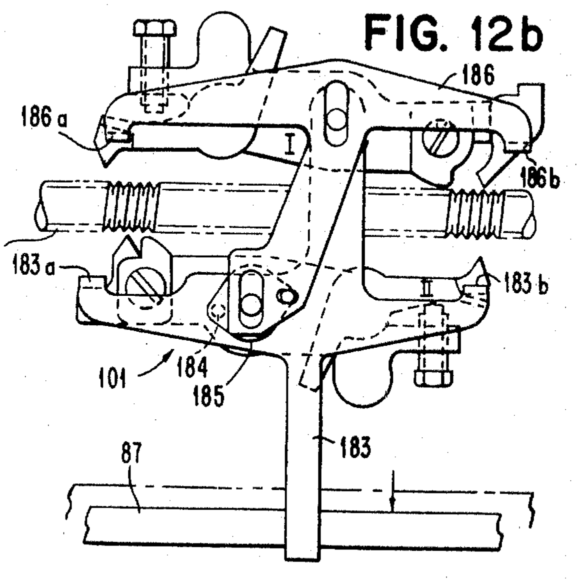

With disengagement of head 82 from belt 2 and the pawls in assembly 101, FIGS. 12*a* and 12*b*, conditions are established for driving head 82 to the home position. This involves movement of the index assembly 16 to the left in relation to an inserted belt and movement of head 82 to the right in relation to the belt. See FIG. 8. Since the belt loading and unloading mechanisms are positioned at a 90° angle in the transcriber from the position shown in the dictating unit, the direction of head restoring is to the front of the transcribing unit as viewed in FIGS. 10 and 14.

When a belt is unloaded from the machine by movement of lever 10 to the right as previously discussed, the belt load contacts 75*a* are transferred to their normally open condition. However, an additional set of contacts as described in the Fackler, et al. patent, remains closed and serves to provide a parallel circuit to operate the drive motor for restoring the head to home position. The Auto Phase contacts 75*b*, FIGS. 4 and 14, are also transferred to their not-phased condition.

Ordinarily, when a belt is in the dictating unit (or the transcribing unit, for that matter), the belt load contacts 75*a* in the units are closed. The various driven devices in the unit derive their source of power from a motor 105, particularly shown in FIGS. 4 and 5. The motor output is reduced by a speed reducer assembly 106, FIG. 4, which drives an output gear 107. When a belt is in position, motor 105 is rotating to drive gears 107 and 109 constantly. Upon movement of belt lever 10 to the right during an unloading operation, the belt load contacts are opened so that the circuit to motor 105 now is primarily controlled by the head restore contacts, described in the Fackler, et al. patent.

Restore lead screw 95 is driven at a relatively high rate of speed by rotation of gear 109, FIG. 14, and due to the engagement of follower 96 with it, drives head 82 toward the head restore contact assembly. Motor drive ceases with head 82 positioned all the way to the right as shown in FIG. 8, which is the home or restored position of head 82.

With the foregoing action, the equipment is now in readiness to receive an inserted belt.

Belt Loading and Initial Phasing

Belt Loading Action

Figure 3:
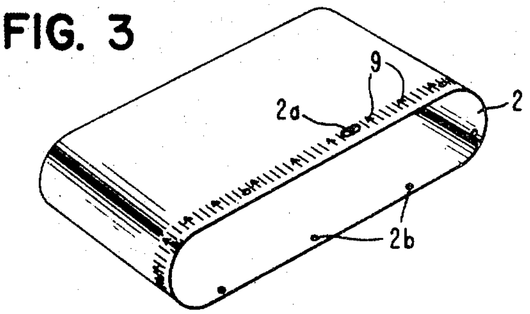
FIG. 3 illustrates a magnetic recording belt medium for use in the dictating unit of FIG. 1. The belt medium may also be used in a transcribing unit.

In order to load belt 2, FIG. 3, in dictating unit 1, the operator grasps belt 2 with arrows 9 pointing in toward the unit and slips the belt over mandrel 7. The belt is inserted as far as it will go without forcing it. As is usual, the placement of belt 2 on mandrel 7 may be at any location with respect to timing aperture 2*a*, FIG. 3. The positioning of aperture 2*a* is immaterial at this time, since means is provided for rotating belt 2 under control of aperture 2*a* to a predetermined initial position with respect to magnetic head 82. This applies to any belt that may be inserted in dictating unit 1. It also applies to any belt that is inserted in the transcribing unit, FIGS. 10 and 14.

Following insertion of belt 2 on mandrel 7, the operator moves belt lever 10 to the left, FIGS. 1 and 4.

Figures 5, 6A, 6B, 6C, 6D:
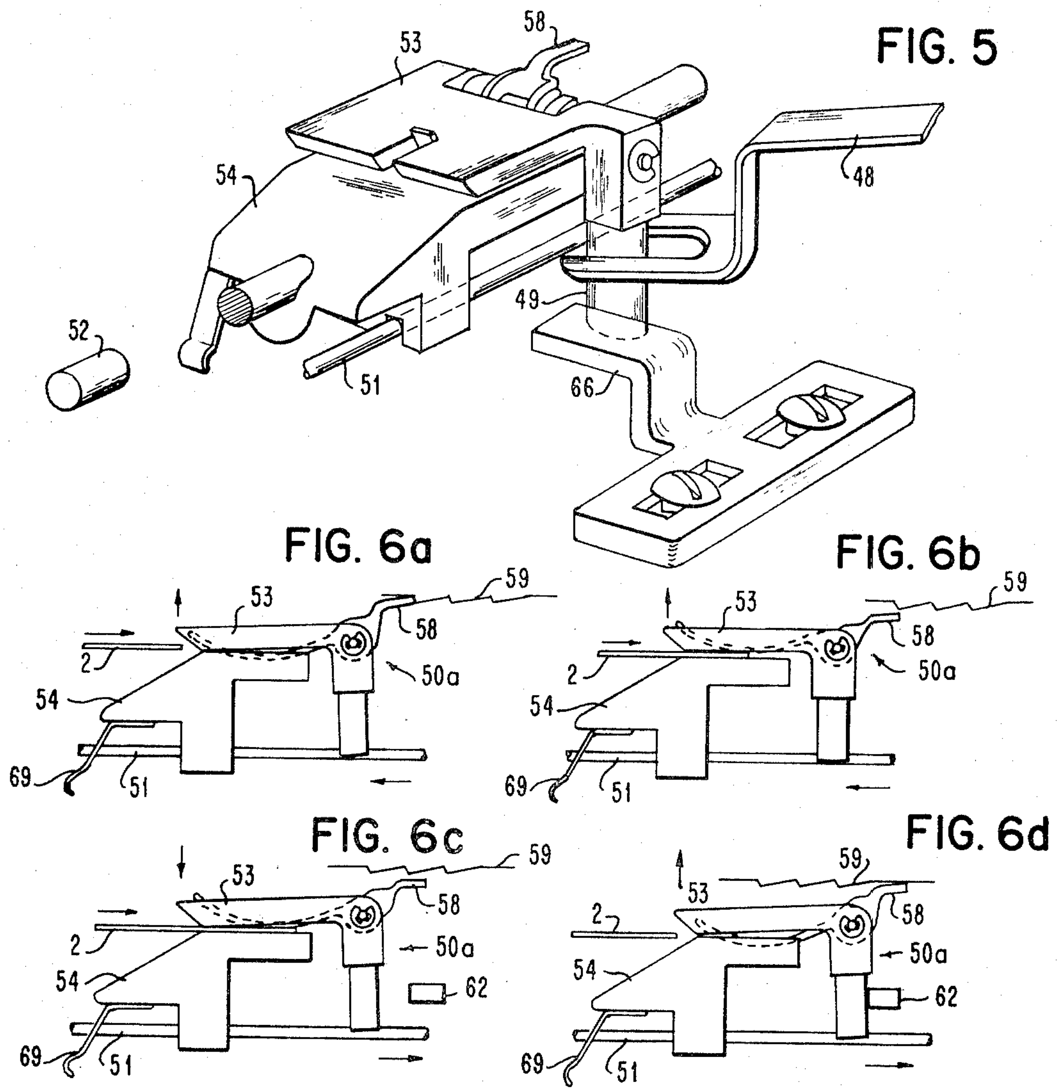
FIG. 5 represents a finger and interposer mechanism in the dictating unit of FIG. 1 for guiding and gripping an inserted belt during belt loading operations.
FIGS. 6*a*–6*d* illustrate an operational sequence of the mechanism of FIG. 5.

Prior to and during such movement of belt lever 10 to the left, gripper assembly 50 (50*a*) is operated according to the sequence shown particularly in FIGS. 6*a*–6*d*. FIG. 6*a* shows the gripper assembly just prior to insertion of belt 2 between the upper and lower fingers 53 and 54. Movement of belt 2 between fingers 53 and 54 operates a sensing lever 58, FIG. 6*b*. Normally, when no belt 2 is inserted in gripper assembly 50 (50*a*), sensing lever 58 contacts a rack 59 which retains gripper assembly 50 (50*a*) in the ready condition and prevents movement of the entire belt gripping and loading assembly, including belt lever 10, to the left.

However, insertion of belt 2 operates sensing lever 58 to clear rack 59 as at FIGS. 6*b*, 6*c*, and 6*d*. Link 48, FIG. 5, acts to rotate upper finger 53 to grip belt 2 when lever 10 is moved to the left. It should be observed that the gripper assembly in FIGS. 5 and 6*a*–6*d* is shown from the rear of the machine and that movement of belt 2 in these figures is just the opposite to such movement in FIG. 4.

In the event the newly inserted belt is in a damaged condition or not properly inserted, the belt may not follow the grippers into the machine. If this happens, the belt will likely slip from under sensing lever 58 which will then rotate counterclockwise and become engaged with another notch in rack 59 to prevent further movement of the loading mechanisms and a consequent false loading operation. Gripping of belt 2 continues until belt lever 10 and gripper assembly 50 have almost reached the furthest position in unit 1 during the belt loading operation. Toward the very end of such movement, finger 53 encounters a stop 62 which rotates finger 53 to release belt 2. The timing is such that the release of belt 2 occurs just as the leftmost edge of belt 2 (rightmost edge in FIGS. 6*a*–6*d*) comes in contact with the flanges on rollers 63 and 64.

The movement of belt lever 10 to the extreme left or belt loaded condition, FIG. 4, reverses the movement of all of the various mechanisms associated therewith including the gripper operating assembly 46, links 56 and 60, cranks 57, 61, and 68, and cam member 73. Rotation of cranks 61 and 68 moves roller 63 further away from roller 64 and applies tension to belt 2 in the unit.

Phasing

Movement of cam 73 also closes belt load contacts 75*a* to supply power to energize motor 105 which thereafter operates clutch assembly 93, shown in FIG. 14. The activation of clutch assembly 93 drives shaft 83 which also supports lead screw 100, FIG. 14. Associated with clutch assembly 93 is a lead screw phase cam 94 which operates against a lead screw zero phase operating member 78, FIG. 14. Engagement of clutch assembly 93 and driving of lead screw 100 from motor 105 rotates cam 94 which is fixed on shaft 83 in a predetermined condition to indicate a zero phase condition of lead screw 100. As soon as lead screw 100 reaches a zero phase condition, cam 94 operates member 78 to transfer zero phase contacts 75*c* in contact assembly 75. The structure is so arranged that pin 92 simultaneously encounters extension 84*a* of link 84, FIG. 14.

The engagement of pin 92 with extension 84*a* disengages clutch assembly 93 and the rotation of lead screw 100 stops when in the zero phase condition. As stated, the lead screw contacts 75*c* are closed to indicate such condition.

Following zero phasing of the lead screw, motor 105 continues to run and rotates belt 2 through the connection of gear 107 with drive roller 64, FIG. 4. Belt 2 has been rotating all during the time of rotation of lead screw 100 prior to lead screw 100 reaching the zero phase condition.

Positioned in unit 1 in line with aperture 2*a* of any inserted belt 2 is a set of aperture sensing contacts 97, FIG. 14. Contact assembly 97 comprises an upper contact element 98 arranged to drop through aperture 2*a* and a lower electrical contact 99 mounted on a portion of sound head carriage member 103, FIG. 14. Contact assembly 97 is also referred to as the "Hole Detect" (HD) assembly, FIG. 15. As soon as aperture 2*a* is detected during rotation of belt 2, contact assembly 97 closes and completes a circuit to ground through the previously closed lead screw contacts 75*c*. As described in the Fackler, et al., patent, the completion of the foregoing circuit energizes Reverse magnet 69, FIGS. 14 and 15. The energization of magnet 89 moves latch 91 and releases link 84 which permits bell crank 86 and contact operating member 74 to rotate counterclockwise, thereby transferring contact assembly 75 to the "phased" condition.

The dropping of bell crank 86 also moves bail 81 counterclockwise through line 79 to move head 82 into engagement with belt 2 and to re-engage the lead screw driving pawls due to movement of retract bail 87, FIG. 12a.

By the foregoing action, belt 2 has been moved into operating position on rollers 63 and 64, lead screw 100 has been phased to a zero condition, and belt 2 has been rotated to an initial phased condition with respect to sound head 82. This action occurs in dictating unit 1 or transcribing unit 5 each and every time that a belt 2 is inserted in one of the respective units. In this fashion, each belt, when initially inserted in position for operation,is accurately phased with respect to the sound head 82 and tracking during recording and playback, or during subsequent transcription of a belt proceeds in a precise manner. The parameters of the system are such that the tracking is accurately maintained within desired limits throughout the remainder of the recording area on an inserted belt. Essentially, this eliminates the necessity for re-synchronizing or phasing the belt with respect to the transducer on each and every cycle of rotation of the belt, as in some prior art devices.

Belt Unloading

Upon termination of dictation, or end of belt, belt 2 is ejected from dictating unit 1 by operation of belt lever 10 to the right, FIGS. 1 and 4, in a manner comparable to that described under the section concerning initial belt loading conditions. Such operation moves roller 63 closer to roller 64, operates cam 73, moves head 82 away from the belt record medium and retracts the pawl assembly 101 in preparation for insertion of another belt record medium.

In the case of the transcribing mechanisms shown in FIG. 14, the belt eject and unloading operation proceeds in a comparable manner to that for the dictating unit. The difference lies primarily in the direction of belt ejection, which in the case of the transcriber, is from the front of the unit, FIG. 10.

Belt Eject Control

Figure 7A:
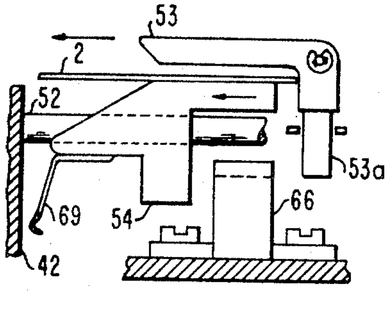
FIG. 7*a*–7*c* represent operation of the belt gripper mechanism during unloading.
Figure 7B:
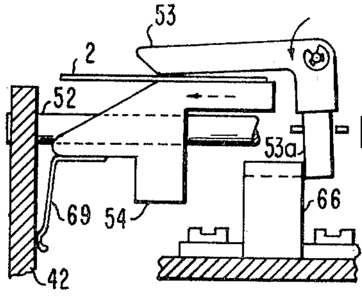
Figure 7C:
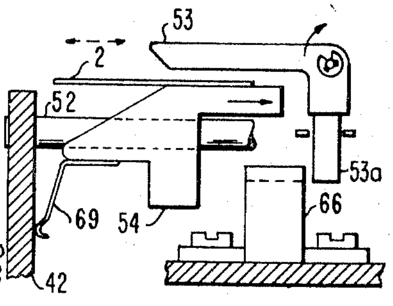

A feature of the present invention is the belt eject control mechanism illustrated particularly in FIGS. 7*a*, 7*b*, and 7*c*.

The purpose of this mechanism is to prevent the inadvertent discharge of the recording belt from the dictating or transcribing machines due to inertia of the belt and the rapid speed of the belt unload operation.

The anit-discharge mechanisms prevents the discharge of the belt by causing load finger 5 to close momentarily at the end of the unload operation, gripping the belt and braking its forward velocity.

Referring to FIGS. 7*a*–7*c*, as belt lever 10 is moved toward the unload position the belt load arm 48 moves finger 53 and slider finger 54 along guide shaft 52 carrying belt 2 to the unload position.

Near the end of the unload travel the lower portion 53*a* of finger 53 strikes a stop 66 causing the finger 53 to rotate to the closed position clamping belt 2 against the slider 54 at which position stop 66 prevents further forward motion of the belt load mechanism.

Spring 69 attached to slider 54 reacts against frame 42, at the end of the unload travel causing slider 54 to move backward allowing finger 53 to rotate to the open position permitting removal of belt 2.

In this manner, belt 2 is retained in convenient position for removal of the operator.

Operation of Dictation Unit

Preparation for Dictation

It is assumed that the mode control knob 20 has been positioned to the center, or Dictate position. Volume control 18 is set to a mid-range position. Following insertion of belt 2 and the automatic initial phasing just described, the unit is essentially ready for dictation. The operator inserts a pad of index slips 12 in housing 13. Head 82 is now located at the home position on belt 2 as reflected by the relative location of scanning lever 16 with respect to the top index slip 15. As seen in FIG. 1, scanning lever 16 is somewhat displaced to the right from the home position. At any time during the course of dictation, head 82 may be manually moved to a desired location on belt 2 by operation of scanning lever 16. Reference is made to FIG. 8 for the action involved. FIG. 8 represents a bottom elevation of the dictating unit with the front of the unit at the top of the figure. Scanning lever 16 has a depressable control element 16*a* that operates through a link 125 and additional members 126 and 127 to move bail 87 between the two conditions shown in FIGS. 12*a* and 12*b* to engage and disengage the pawl assembly 101, Depression of button 16*a*, therefore, disengages pawl assembly 101 enabling ready movement of sound head 82 back and forth in relation to an inserted belt 2.

Scanning lever 16 forms part of a scanning assembly 13 that includes a member 130 mounted for movement from the full line condition shown in FIG. 8 to the dashed line condition on a guide rod 133. Pivotally attached to member 131 is a link 135 that operates a lever 140 having another link 141 attached to its rearmost extremity. Link 141 is attached to sound head carriage 103 that mounts sound head 82. With the structural arrangements shown, movement of scanning lever 16 from left to right in FIG. 12 moves carriage 103 from right to left, thereby moving sound head 82 from right to left in relation to an inserted magnetic belt 2. Conversely, movement of scanning lever 16 from right to left moves sound head 82 from left to right in relation to the belt record medium 2.

In the dictating unit, the belt medium is loaded into position with a first edge against flanges on the belt mandrels and the opposite edge representing home position for scanning. A centrally-pivoted linkage connects the transducer that scans from right to left with a scanner index assembly positioned at the front of the unit and moving left to right adjacent an index slip in a conventional manner. The foregoing establishes compatibility of scanning of information between the present equipment and various other equipment using comparable media, such as the IBM Model 210 series and the Model 224 portable, but enables loading the opposite edge of the belt against flanges, in the present equipment. For compactness, the transducer in the present equipment is arranged for travelling movement underneath the belt record medium rather than along the upper surface as in the IBM Models 210 and 214 machines. As one result of this and for initial phasing purposes, the opposite edge of the belt is loaded into the present equipment when contrasted with the 210 and 214 Series. Even though the opposite edge of the belt is loaded into the present equipment, belts originally recorded on the 210 Series or Model 224 portable will still be scanned since the transducer in the present equipment will scan in the proper direction. Also, the index means will move in directions compatible with the previous equipment so that essentially the same style of index slip can be used in either equipment. In summary, the interconnection of the index means and the transducer in the present equipment insures compatibility of scanning of record media in the present equipment with the 210 and 214 Series. The transcriber unit has similar adaptability.

Prior to commencement of dictation, the dictator will also have selected a 10 minute or 20 minute recording time by operation of button 27, FIG. 2. He will also have moved button 26 to select speaker 28 in unit 1 or speaker 37 in microphone 3 for use during playback of dictated material.

Following preparation for dictation as discussed, the dictator grasps microphone 3, which is assumed to be stored in microphone well 6, FIGS. 1 and 2, and pulls it toward him a convenient distance for use during dictation. Microphone 3 is interconnected with the machine circuits through cord 4 and when microphone 3 is stored in well 6, cord 4 is wound on a cord reel assembly 245, that is better seen in FIG. 12. Cord reel assembly 245 maintains a spring tension on cord 4 that tends to pull the cord into the unit. When microphone 3 is in use, cord 4 is maintained at a length determined by the dictator. When dictation is finished, the dictator may retract cord 4 by depressing button 30, FIG. 1, whereupon cord reel assembly 245 pulls cord 4 into the unit. Microphone 3 is permitted to follow the cord as it winds into the unit and is again placed in storage well 6.

Reference is made to the Wing publication in the May, 1967 IBM Technical Disclosure Bulletin in the "Other References" section for a description of a typical cord reel assembly that will fulfill the functions required by cord reel assembly 245.

Dictator Logic

The detailed circuits for the dictating unit fully described in the Fackler, et al. patent are somewhat simplified in the logic diagram of FIG. 15. Only the major components involved in operation of the dictator unit are shown in FIG. 15. These include microphone 3 shown in the dashed box so designated and various interconnecting terminals that correspond to an accessory connector. A complete sequence of operations of the dictator unit will clarify the logic involved.

In FIG. 15, loading of a magnetic belt in the unit closes the belt load contacts (BL). This completes a circuit from the Power Source (PS) through the Not Head Restore ($\overline{HR}$) and Not Phase 4 ($\overline{PH4}$) contacts to drive motor 105. Mechanisms associated with belt loading are latched to prevent dictation until the lead screw has reached a zero phased condition and the aperture *2a*, FIG. 2, in belt 2 is sensed by the apparatus. The latching mechanism is released by operation of Reverse solenoid 89 that is driven by transistor Q23. Rotation of lead screw 100 to a zero condition closes Lead Screw contacts (LS). Sensing of aperture *2a* in belt 2 closes the Hole Detect (HD) contacts. A circuit to ground is thereby completed through the LS and HD contacts, through Not Phase 2 to the base of transistor Q23 to saturate it and energize Reverse solenoid 89 to release the latching mechanism and indicate that the phasing operation has been completed.

A Dictate mode is established by positioning of mode knob and switch assembly 20 to the center or Dictate position which prepares the logic for recognition of the Record (REC) status. Mode control button 32 on microphone 3 is also moved to the upper or Record position to prepare the machine circuits for recording of dictation. When the operator of the unit desires to dictate, he depresses dictate bar 33 that completes a number of circuits as follows. A circuit exists from Power Supply (PS) through Belt Load (BL) contacts, Not Auto-Off ($\overline{AO}$), through Phase 1 (PH1), Connector 6, Dictate Bar (BAR), and thence to several circuits in FIG. 15.

Power is applied through connector 20 to pick relay RR that completes a circuit to the magnetic head for recording signals. This also activates the oscillator for bias and erase signals.

A parallel circuit exists through the Record (REC) logic, connector 12 to the base of transistor Q9 in connection with energizing relay RR and also to the top of motor 105 through Phase 4 (PHe) contacts, diode 150, and coil L-1 for driving belt and head mechanisms to trace a helical path on belt 2.

During dictation, movement of the Letter-Secretary button 39 to the Letter position (LET), energizes the Letter solenoid 190 to mark a letter indication on index slip 15. Movement of button 39 to the lower position closes Secretary (SEC) contacts to operate the Secretary solenoid 191, thereby making a Secretary Instruction mark on index slip 15. During dictation, the fact that the equipment is in a Record mode is indicated by the energization of lamp 35 on microphone 3.

If it is desired to review material previously dictated, the dictator moves mode button 32, FIG. *1a*, to the lowest position against the spring bias which closes a connection to ground through connectors 5 and 7, the Review switches (REV), connector 8, Phase 2 contacts (PH2) to transistor Q23 to energize the Reverse solenoid 89 and backstep head 82. Optionally, a repeated backstepping may be obtained by continued depression of button 32 to the Review position.

Stepping of head 82 forwardly in relation to belt 2 is accomplished by movement of button 38 on microphone 3 to the upper position. This completes logic through the Forward (FWD) contacts, connection 18, to the base of transistor Q22 for energizing Forward solenoid 88.

The signals during recording are provided from microphone transducer 36 to the machine amplifier circuits from terminals 1 and 3.

In order to listen to previously dictated material, the dictator moves mode button 32 to the center position which operates Listen (LIS) logic. Closure of the Listen contacts (LIS 1 and LIS 2) completes several circuits. The circuit from LIS 1 through connector 12 biases transistor Q9 on to activate motor circuit transistors Q2–Q8, the second regulator, and energize motor 105. Another circuit activates Playback relay PR, relay RP, the power amplifier (B stage), through Not Telephone 3 ($\overline{\text{TEL 3}}$), connector 11, and Listen 2 (LIS 2).

With battery, power for the pre-amplifier is denied from the third regulator stage and controlled by switch LIS 1, with AC, power comes from the $\overline{\text{AO}}$ contact.

During the operation of motor 105, regulation is provided by the motor control block under control of the second regulator block. A third regulator circuit is also provided.

Dynamic braking is provided by transistor Q1 which conducts upon termination of dictation and listening and that serves as an effective short circuit across motor 105 to bring motor 105 rapidly to a standby condition. During dictation, the preamplifier states (PRE-AMPL) are activated from the Not Automatic Off connection ($\overline{\text{AO}}$). During a Listen mode, the connection to the oscillator is effectively open since Dictate bar 33 is not depressed.

The logic includes buzzer 166 that is operated as an example by the End of Belt (EOB) contact.

Forward Spacing and Backspacing

As described in the Cater, et al. patent, the dictating and transcribing apparatus are provided with unique facilities in the form of a symmetrical Forward and Backspacing mechanism operated by energization of Forward and Reverse solenoids, when desired.

In FIG. 9, solenoids 88 and 89 are connected to operate a bail member 170 mounted for pivoting action on rod 171. Bail member 170 is connected by pin 172 to an operating member 173 mounted for reciprocating movement about fixed pin 174. Operation of Reverse solenoid 89 moves bail 170 in a counterclockwise direction about rod 171, FIG. 9, and by the connection at 172 rotates operating member 173 in a clockwise direction about rod 174. Connected to operating member 173 is a stepping bail 175 mounted for reciprocating movement indicated by arrow 177, FIG. 9. As shown in FIG. 8, stepping bail 175 is arranged to pass between the upper and lower sets of escapement pawls in assembly 101.

With the arrangement shown in FIG. 9, energization of Reverse solenoid 89 operates bail 170 to move stepping bail 175 in such a manner that pawl assembly 101 is operated to effect stepping of magnetic head 82 in a reverse direction with respect to an inserted belt, while energization of Forward solenoid 88 operates bail 170 and stepping bail 175 to control operation of pawl assembly 101 for effecting movement of magnetic head 82 in a Forward direction with respect to an inserted belt. From previous discussion it will be recalled that home position of head 82 is to the right of FIG. 8, thereby establishing movement of head 82 to the left as a Forward scanning movement. Pawl assembly 101 is thereby operated to move the carriage assembly 103 to the left along lead screw 100 for a Forward stepping operation and to the right for a Reverse stepping operation.

Manual Retraction of Pawl Assembly 101

The manual retraction of pawl assembly 101 was previously alluded to in connection with operation of scanning knob 16, FIGS. 1 and 8. More specifically, operation of scanning knob 16 moves pawl retract bail 87 and by interconnection whown in FIGS. 12*a* and 12*b* operates retractor 183 in a downward direction. Retractor 183 is connected at 184 with a retractor driver 185 that is rotated from the condition shown in FIGS. 12*a* to that shown in FIGS. 12*b*. Such rotation of retractor driver 185 moves retractor 186 upwardly to retract assembly 1 from lead screw 100.

To summarize, movement of pawl retract bail 87 from the normal position in FIG. 12*a* to the activated position in 12*b* moves retractor 183 downwardly and retractor 186 upwardly to disengage all pawls from lead screw 100. The actual disengagement is effected by extensions 183 and 183*b* of retractor 183 and 186*a* and 186*b* of retractor 186.

Semi-Automatic Erase

The apparatus is equipped with mechanisms for erasing a magnetic belt in its entirety, whenever desired by the operator of the equipment. In one form, the erase structure includes the erase button 40, FIGS. 1 and 4, and a pivotally mounted magnet structure 156 that is manually moved toward the magnetic belt, when inserted in the machine and held against the belt while the motor drives the belt past the magnet. The structure includes a permanent magnet 157 that extends coextensively with the transverse width of the belt and that effectively restores the belt to a neutral condition for subsequent recording operations. This is similar to the erasing operation described in the IBM Customer Engineering Instruction and Reference Manuals in the "Other References" section.

In another form, the magnetic assembly 156 is moved toward the magnetic belt as in the first structure but is provided with latching means, not shown, to retain the structure against the belt even though button 40 is only temporarily operated. In this version, movement of the magnetic structure operates contact assembly 158, FIG. 4, to provide a circuit connection for driving the motor at high speeds. The structure is arranged in such a manner that at least one revolution of the entire belt is accomplished past permanent magnet 157, whereupon unlatching means, not shown, is operative to restore the magnet structure 156 to the normal inactive condition.

Transcribing Unit

General Description

In accordance with the present invention, a transcribing unit is provided that makes use of essentially the same basic belt record medium handling, loading, ejecting, and phasing mechanisms as are used in the dictating unit with the exception that the mechanisms are oriented to face the transcriber during normal operation for easier loading and unloading operations. The transcriber unit is pictured in FIG. 10. Various mechanisms concerned with belt loading and unloading, phasing, reverse and forward scanning and other mechanisms are shown in FIGS. 11, 12*a* and 12*b*, and 14. Additional mechanisms concerned with a Word Recall operation as set forth in the Ridings, et al., application are specifically shown in FIGS. 11, 13, and 14.

As with transcribing units in the prior art, the primary objective of the transcribing unit according to the present invention is to facilitate the transcription of previously recorded medium. Operating instructions for the unit are set forth below.

Transcribing Unit Operating Instructions

Loading Belt

1. The belt 2 is placed on the machine by sliding it over the mandrel 11 with the arrows pointing toward the machine. The belt is inserted into the machine as far as it will go without forcing it.

2. The belt release lever **10*b*** is moved to the left to load the belt. Thereafter, the belt rotates at high speed. When it stops it is automatically phased.

Removing Belt

1. Belt release lever **10*b*** is moved to the right. The belt will partially extend from the machine at this time.

2. The belt is then manually removed from the machine Scanner lever **16*a*** automatically returns to the left margin.

Index Slip Loading and Removal

1. The index slip **15*a* is inserted into the holder 13*a***.

2. The slip is slid out of the holder for removal.

Headset

Removing

1. The operator grasps and pulls headset 14 out of the unit a convenient distance. Tension is released on the headset cable allowing the cord to lock into position. (Note the Dyar, et al., patent application.)

2. The earpieces are twisted sideways until they snap into an expanded condition.

3. The earpieces are spread apart to put the headset on.

Replacing

1. The earpieces are pushed together.

2. The earpieces are twisted until they snap into their rest position or until they lie side by side.

3. The headset is held securely in one hand. The rewind button **30*a*** is depressed to retract the headset cable.

4. The headset is guided into the storage compartment.

5. The rewind button **30*a*** is released.

Foot Control

Operating

1. Start-Stop. The right side of the foot control 8 starts the machine when depressed. The machine stops when the right side is released.

2. Review. When the left side of foot control 8 is depressed, the sound head is moved back approximately 10 words or 2 seconds of recording time when the recording time selector **27*a* is in the 10 minute position. With an optional feature, holding the left side depressed moves the sound head back continuously in six second increments, thus giving an extended review. If the recording time selector 27*a*** is in the 20 minute position, the measured review will be 12 seconds or approximately 20 words. For most dictating and transcribing, the switch is in the 10 minute position.

3. Forward Review. Depression of the top of foot control 8 moves the sound head forward approximately 10 words or 6 seconds. With an optional feature, keeping the foot control depressed causes the sound head to advance continuously in 6 second increments. If recording time selector **27*a*** is in the 20 minute position, the forward movement will be in 12 second increments or approximately 20 words.

Unit Operating Control

1. Tuning Control. Tuning control 17 is not normally used. This control is provided so that belts recorded on other dictating equipment can be transcribed on the present transcriber. If a belt without an initial phasing aperture is placed in the transcriber, the automatic initial tuning feature is not operative. The belt will continue to rotate, but is stopped by tapping the forward review (top) portion of the foot control. Manual tuning can now be accomplished by moving tuning control 17 left or right.

2. Automatic Word Recall. Releasing the right side of foot control 8 activates the auto recall mechanism. This allows the last few words of dictation to be repeated the next time the right side of the foot control is depressed. The amount of recall is adjustable from: No recall to about five words. This feature is adjusted to the amount of recall desired by moving recall lever 19 left or right. The panel is marked in seconds from 0–5 seconds.

3. Scanner Lever. Scanner lever **16*a* is provided to allow manual location of the sound head to any position on the belt. Any portion of the recorded information can be reached by pushing the lever toward the machine and sliding left or right. If the right side of foot control 8 is depressed when moving the scanner lever, the transcriber can at the same time listen to what is recorded on the belt. If scanner lever 16*a*** is moved, either manually or by depressing the forward review position of the foot control, to the far right of the index slip area, the transcriber will automatically shut off. The unit is turned back on by manually moving the scanner lever to the left.

4. Speed Control. The playback speed is adjusted by speed control knob 22, which is rotated left or right for adjustment. The speed is decreased by turning it to the left and increased when turned to the right. The dot in the center of the control indicates the middle of the speed range.

5. Tone Control. The tone can be adjusted by control 29. The dot in the center of this control indicates the middle of the range.

6. Volume Control. Volume control 31 varies the loudness of the dictation heard through headset 14. The dot on the knob represents the middle of the volume range.

Erasing the Belt

The erase knob **40*a*** is used to initiate complete erasure of the entire belt after it has been transcribed. This feature is semi-automatic. Once the knob has been depressed, it latches into position, and as soon as the belt has been completely erased, returns to its normal position. The machine stops to indicate the belt has been erased.

Headset

Headset 14 is positioned for storage in compartment 34 of transcribing unit 5. As described in the Dyar, et al., patent indicated in the "Cross Reference" section above, headset 14 is collapsible for storage in unit 5 and when withdrawn from the unit is expandable for normal use by the transcriber.

Preparation for Belt Loading and Phasing

Following removal of a previous magnetic belt 2 from unit 5, the sound head in unit is restored to the home margin in a manner similar to that described in connection with the dictation unit. This is effected by engagement of sound head 82 with restore lead screw 95, FIG.

14, and the application of power from transistor T8 through the Not Head Restore ($\overline{HR}$) contacts to the motor through the Not Phase 1 ($\overline{PH\text{-}1}$) contacts.

Normally, the transcriber selects an index slip 15*a* that is related to the belt to be transcribed and positions it in the index retainer 13*a*, FIG. 15. Another belt 2 is then slipped onto mandrel 11 into the transcribing unit as far as it will go. Thereafter, belt lever 10*b* is moved to the left and belt 2 is pulled into unit 5 on drive rollers, such as drive roller 63, FIG. 14, by a gripper assembly such as that described in connection with FIGS. 5 and 6*a*–6*d*. Movement of belt lever 10*b* to the left latches various belt loading and phasing mechanisms and applies power to the motor in the unit to rotate lead screw 100 and belt 2. Member 84 is latched by latch member 91, FIG. 14, and clutch 93 is engaged to drive lead screw 100. As soon as lead screw 100 reaches a zero phase condition as reflected by pin 92 contacting member 84, clutch 93 is disconnected. Belt 2 continues to drive until aperture 2*a* is sensed by contact assembly 97. Rotation of lead screw 100 to the zero phase condition closes the lead screw contacts while detection of aperture 2*a* closes the Hole Detect contacts. A circuit is thereupon completed to actuate forward magnet 89*a* to release the mechanisms previously latched which includes release of member 86 and transfer of the Phase contacts thereby indicating that the lead screw and belt have been phased to a proper initial position. The unit is thereupon ready for use by the operator and control by appropriate movement of foot control 8.

Transcriber Logic

Figure 16:
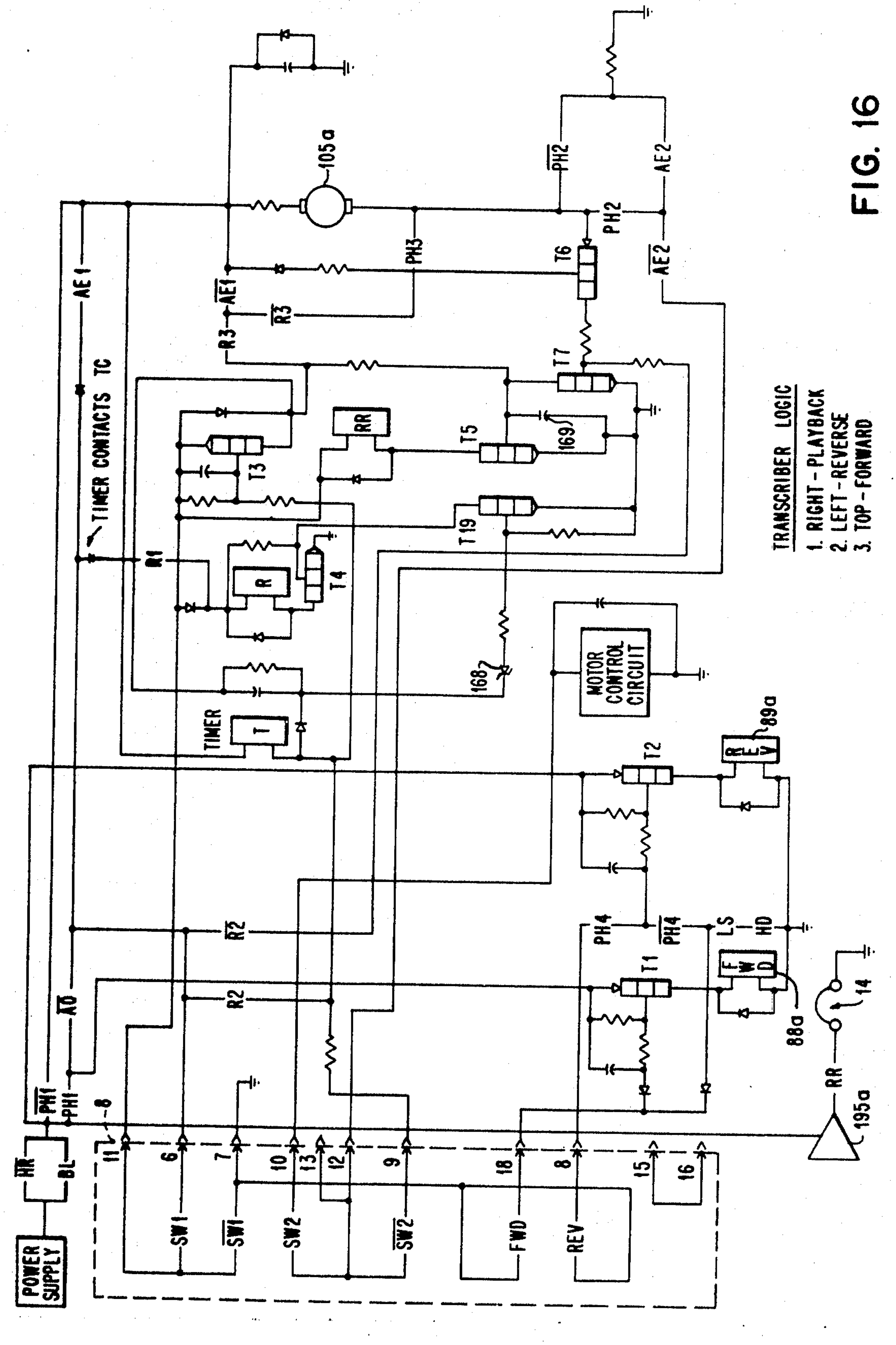
FIG. 16 is a logic diagram for the circuit actions in the transcribing unit of FIG. 10.

FIG. 16 illustrates the logic involved in operation of the transcriber circuits described in detail in the Fackler, et al, patent. The logic is clarified by consideration of a typical transcribing operation. The logic includes the foot contorl 8 with switch 1 and 2 contacts (SWL and SW2) that are movable by depressi n of foot control 8 on the right side. The foot control includes Forward (FWD) and Reverse (REV) contacts for operating Forward and Reverse solenoids 88*a* and 89*a* under control of associated transistors T1 and T2. The logic further includes timer T, timer contacts TC, an R relay and associated transistor T4 controlled by transistor T19, an RR relay controlled by transistor T5 that is in turn selectively controlled by transistors T6 and T7 and motor 105*a* together with a motor control circuit for regulating its speed in a selected speed range.

A typical sequence of operations involves unloading a belt and reloading a new belt to continue transcription. When a belt is ejected from transcribing unit 5, the sound head is usually away from the home margin position as reflected by Head Restore (HR) contacts being closed as indicated with the designation Not Head Restore ($\overline{HR}$). Such contacts being closed complete a circuit through Not Phase 1 contacts to drive motor 105*a* for restoring sound head to the initial margin location. When the transcriber inserts a belt into the unit, the belt load (BL) contacts close to further supply driving power to motor 105*a* through the Not Phase 1 contacts. This also conditions amplifier stage 195*a* for operation when the RR relay becomes energized later.

Immediately following insertion of a belt in the unit, the lead screw is phased to a zero condition and aperture 2*a* of belt 2 is sensed to establish a desired initial relationship between sound head 82 and belt 2 in the unit. The belt loading and phasing mechanisms are latched with all of the phase contacts in an inactive or logical Not condition and retained in such condition until the lead screw is phased and the belt aperture is sensed. The mechanisms are reset upon such occurrence under control of a latch member operated by the Reverse solenoid 89*a*. Closure of the lead screw (LS) contacts indicating a lead screw phase condition and the Hole Detect (HD) contact complete a circuit to ground for biasing transistor T2 on to energize the Reverse solenoid 89*a*, thereby unlatching the phasing mechanisms and indicating the the unit is ready for operation. This moves all of the Phase contacts to their phased condition.

To operate the unit, the transcriber depresses foot control 8 on the right side which transfers switch assemblies SW1 and SW2 to supply power to the various circuits of the machine. Power is from the power supply through the belt load (BL) contacts, Phase 1 (PH1) contacts, Automatic Off ($\overline{AO}$), terminal 6 of foot control 8, switch 1, and terminal 11 to the upper side of relays R and RR, rendering the latter relays active and transferring the associated contacts. The relay RR contacts complete the amplifier circuits to headset 14. Power is also supplied from terminal 8, R3, and $\overline{AE\text{-}1}$ to the upper side of motor 105*a*. The lower side of the motor circuit is completed through the automatic erase contacts $\overline{AE\text{-}2}$ through switch SW2, connector 10, to the motor control circuit. Motor 105*a* thereupon operates to drive sound head in unit 5 in relation to magnetic belt 2 in order to trace a helical path on the belt.

During operation, the transcriber may wish to scan the belt forwardly or reversely and does so by appropriate depression of foot control 8. A Forward scan is initiated by depression of the top of foot control 8 closing the forward (FWD) contacts to terminal 18 and driving transistor 71 to energize Forward solenoid 88*a*. This operates the escapement pawl assemblies described elsewhere. Scanning of the sound head in a reverse direction with respect to magnetic belt 2 is effected by depression of the left side of foot control 8 which closes the reverse contacts the biases transistor T2 to operate the Reverse solenoid 89*a*.

The unit has an automatic recall feature that is controlled by movement of automatic recall lever 19 on the front of the unit through a range from No recall to approximately five words of recall. While in a Playback mode with switches SW1 and SW2 transferred, the circuits of the equipment are prepared to supply an automatic recall operation upon terminal of the Playback.

Relay R is held through its own R1 contacts and timer contacts TC that are controlled by the timer rack 243, FIG. 16.

Assuming that the automatic recall lever 19 is set at a position other than the zero position, the operation of the automatic recall feature is as follows. Release of foot control 8 establishes the Not switch 1 and Not switch 2 conditions ($\overline{SW1}$ and $\overline{SW2}$) and reverses connections to motor 105*a* to reverse the direction of driving of motor 105*a* in order to drive belt 2 in a reverse direction in relation to the sound head. Also, this rotates gear 260, FIG. 16, to drive rack 243 toward strap 265 of contact assembly T-1 in order to open contact assembly TC and terminate the recall operation. The extent of recall is determined by the relative location of rack 243 in relation to strap 265 as determined by the setting of stop 242 that is directly controlled by movement of automatic recall lever 19.

The circuit connections for reversing the rotation of motor 105*a* are from power supply, belt load (BL) contacts, Phase 1 (PH1), Not Automatic Off ($\overline{AO}$), R2 contacts, Not Switch 2 ($\overline{SW2}$), connection 12, Not Automatic Erase contacts $\overline{AE2}$, Phase 2 contacts to the bottom of motor 105*a*. This supplies approximately 18.0 volts on this side of the motor for driving purposes. The opposite side of the motor is grounded through the automatic erase contacts ($\overline{AE1}$), the R3 contacts, transistor T3 connector 11, Not Switch 1 ($\overline{SW1}$), connector 7 to ground. Ground is also applied to the timer coil which through the mechanisms shown in FIG. 16 moves rack 243 into engagement with gear 260. Opening of the timer contacts TC drops relay R and timer T. In this manner, a desired amount of recall is automatically obtained in the equipment.

If the operator wishes to terminate the timer operation prior to its normal completion, she again depresses foot control 8 to transfer the playback switch contacts SW1 and SW2 into a Playback mode. Such transfer of the SW1 and SW2 contacts opens the circuits for reverse driving of motor 105*a*, terminates the energizing circuit for the timer, and through transistor T19 drops relay R to permit the circuits to settle down. Relay R is then able after a predetermined length of time to become energized again as in a normal Playback mode of operation. Transistors T5, T6, and T7 are effective to control the relay RR that in turn controls muting of the audio circuits.

Scan Operation

Pushing scanning lever 16*a* in toward the machine enables movement of the scanner mechanism and magnetic head to any desired position on index slip 15*a* and with respect to belt 2. The movement of scanning lever 16*a* operates pawl retract bail 87, FIG. 12*a*, to disengage pawl assembly 101 from lead screw 100 and permit easy movement of the sound head in the unit.

FIG. 8*a* illustrates the scanner mechanism in the transcribing unit on a reduced scale as seen from the bottom of the unit. A comparison of FIGS. 8 and 8*a* reveals the structural differences in the dictating and transcribing unit scanner mechanism in order to achieve the 90° difference in orientation between the two units.

In FIG. 8, a bottom elevation of the dictating unit, movement of scanner lever 16 left to right from "0" index to "100" index is accompanied by opposite movement of sound head carriage 103 (and sound head 82) from "0" index to "100" index. The converse is true. In the transcribing scanner mechanism, FIG. 8*a* (also a bottom elevation), on the other hand, movement of the scanner lever 16*a* top to bottom from "0" index to "100" index through bell crank 145 and attached linkages 146 and 147 effects movement of sound head carriage 103 (and sound head 82) right to left from "0" index to "100" index. Link 147, FIG. 8*a*, is connected to the opposite end of carriage 103 from the connection of link 141, FIG. 8.

Automatic Recall Feature

The transcribing apparatus and the dictating apparatus, if desired, incorporates means for automatically repositioning the sound head in relation to the magnetic belt 2 each time that the foot control is released following a Playback operation in order to pick up the last several words of dictation when the equipment is started again. The recall is adjustable by means of the recall lever 19, FIG. 10, anywhere from a No Recall condition to approximately five words. The recall feature includes various structures shown particularly in FIGS. 11, 13 and 14 and is fully described in the Ridings patent. For convenience, a brief description follows.

The operator adjusts recall lever 19 prior to a transcribing operation, normally, and readjusts as desired during the course of transcribing operations. In FIG. 13 recall lever 19 extends from a block 230 that is slidably mounted for movement to the left and right on guide rods 231 and 232. Extending from block 230 is a pin 234 cooperating with a link 235 mounted for pivotal movement at 236. Connected to link 235 by clevis link 238 is a lever 240 centrally mounted for pivoting at 241. Lever 240 has an adjustable stop 242 arranged for cooperation with a timer rack 243, the latter three items also being shown in FIGS. 11 and 14. Rack 243 is arranged for movement left to right and right to left in the figures with a spring member 250 maintaining rack 243 generally to the left against stop 242. Positioned adjacent extremity 243*a* of rack 243 is the set of timer contacts TC. Rack 243 is also movable slightly upwardly and downwardly as indicated by arrow 252, FIG. 11, under control of a timer magnet T. This is effected by movement of a timer arm 254 engaging rack 243 in slot 243*b* by pin 256. Rack 243 is positioned adjacent a driving gear 260 for driving from left to right during its operation.

Considering the structural aspects first, rack 243 normally rests against stop 242 and by energization of timer magnet T through armature 262 is moved upwardly under control of arm 254 and pin 256 into engagement with gear 260 driven from motor 105*a* through clutch 270. For clarity, armature 262 is shaped slightly differently in FIG. 11 in comparison with FIG. 14. Adjustment of recall lever 19 moves rack 243 closer or further away from contact assembly TC. Contact assembly TC is incorporated in a driving circuit for motor 105*a* to drive the motor and hence the sound head in relation to magnetic belt 2 a varying distance depending upon the time it takes rack 243 to encounter operating strap 265 of the timer contact assembly TC and open contacts TC. Reference is made to the Transcriber Logic section and to the Ridings case, for further details of operation.

While the invention has been particularly shown and described with reference to several embodiments, it will be understood by those skilled in the art that various changes in form and detail may be made without department from the spirit and scope of the invention.

What is claimed is:

1. An arrangement for linearly scanning a record medium in dictation apparatus, comprising:

loading means for positioning said record medium in a scanning position in said apparatus, with at least a portion of said medium being maintained in a flat condition in a scanning plane;

a transducer;

a transducer carriage supporting said transducer;

first guide rod means in said apparatus, said first guide rod means mounting said transducer carriage and said transducer for reciprocating movement to and from a home position at one end of said first guide rod means;

first mounting means mounting said first guide rod means adjacent said medium so that said transducer is normally maintained in contact with said medium during transducing operations and is reciprocable in a scanning path adjacent said record medium;

an index assembly;

an index carriage supporting said index assembly; second guide rod means in said apparatus, said second guide rod means mounting said index carriage and said index assembly for reciprocating movement to and from a home position at one end of said second guide rod means;

second mounting means mounting said second guide rod means in parallel relation with and at a fixed selected distance from said first guide rod means in said apparatus so that said index assembly is supported in a location for viewing and control by an operator of said apparatus, and the arrangement being such that the home position of said index assembly on said second guide rod means is at the opposite end of said second guide rod means with respect to the home position of said transducer carriage on said first guide rod means;

a centrally pivoted substantially linear lever member, said lever member having a first extremity respectively associated with said first guide rod means and said transducer carriage and a second extremity respectively associated with said second guide rod means and said index assembly;

pivot means positioned in an intermediate location between said first guide rod means and said second guide rod means, said pivot means mounting said lever member with said first and second extremities in proximity to their respective associated guide rod means;

a first link element pivotally interconnecting the first extremity of said lever member with said transducer carriage; and a second link element pivotally interconnecting the second extremity of said lever member with said index carriage;

whereby controlled reciprocating movement of said index assembly by an operator of said apparatus in one direction with respect to said record medium effects movement of said transducer in the opposite direction with respect to said record medium.

2. An arrangement for linearly scanning a record medium in dictation apparatus, comprising:

loading means for positioning said record medium in a scanning position in said apparatus, with at least a portion of said medium being maintained in a flat condition in a scanning plane;

a transducer;

a transducer carriage supporting said transducer;

first guide rod means in said apparatus, said first guide rod means mounting said transducer carriage and said transducer for reciprocating movement to and from a home position at one end of said first guide rod means;

first mounting means mounting said first guide rod means adjacent said medium so that said transducer is normally maintained in contact with said medium during transducing operations and is reciprocable in a linear scanning path adjacent said record medium;

an index assembly;

an index carriage supporting said index assembly;

second guide rod means in said apparatus, said second guide rod means mounting said index carriage and said index assembly for reciprocating movement to and from a home position at one end of said second guide rod means;

second mounting means mounting said second guide rod means at right angles with respect to said first guide rod means in said apparatus so that said index assembly is supported for movement in a path at right angles to said scanning path and in a location for viewing and control by an operator of said apparatus;

a centrally pivoted substantially right angled lever member, said lever member having a first extremity respectively associated with said first guide rod means and said transducer carriage and a second extremity respectively associated with said second guide rod means and said index carriage;

pivot means positioned in an intermediate location between said first guide rod means and said second guide rod means, said pivot means mounting said lever member with said first and second extremities in proximity to their respective associated guide rod means;

a first link element pivotally interconnecting the first extremity of said lever member with said transducer carriage; and a second link element pivotally interconnecting the second extremity of said lever member with said index carriage;

whereby controlled reciprocating movement of said index assembly by an operator of said apparatus in a path at right angles to the scanning path of said transducer with respect to said record medium effects reciprocating movement of said transducer adjacent said record medium in said scanning path.

* * * * *